United States Patent [19]
Hill et al.

[11] Patent Number: 5,948,194
[45] Date of Patent: Sep. 7, 1999

[54] IN-LINE MICROWAVE HEATING OF ADHESIVES

[75] Inventors: David John Hill, Ann Arbor; Ray Alexander Dickie, Northville, both of Mich.

[73] Assignee: Ford Global Technologies, Inc., Dearborn, Mich.

[21] Appl. No.: 09/096,826

[22] Filed: Jun. 12, 1998

[51] Int. Cl.$^6$ .............................. B32B 31/00; B29C 47/02
[52] U.S. Cl. ................. 156/108; 156/244.17; 156/273.3; 156/275.7; 156/380.9; 156/578; 264/474; 264/211.24; 219/693; 219/750
[58] Field of Search ............................... 156/108, 244.11, 156/244.17, 273.3, 275.5, 275.7, 379.8, 380.9, 575, 578; 264/474, 211.24; 425/378.1; 219/693, 694, 702, 750, 762, 203

[56] References Cited

U.S. PATENT DOCUMENTS

| | | |
|---|---|---|
| 3,843,860 | 10/1974 | Jory et al. . |
| 3,851,131 | 11/1974 | Johnston et al. . |
| 4,207,452 | 6/1980 | Arai . |
| 4,760,228 | 7/1988 | Kudo . |
| 5,064,494 | 11/1991 | Duck et al. . |
| 5,188,256 | 2/1993 | Nottingham et al. . |
| 5,421,940 | 6/1995 | Cornils et al. ........................... 156/108 |
| 5,471,037 | 11/1995 | Goethel et al. . |
| 5,719,380 | 2/1998 | Coopes et al. ........................... 219/693 |

FOREIGN PATENT DOCUMENTS

| | | |
|---|---|---|
| 0 618 057 A1 | 10/1994 | European Pat. Off. . |

*Primary Examiner*—Michael W. Ball
*Assistant Examiner*—Michael A Tolin
*Attorney, Agent, or Firm*—Damian Porcari

[57] ABSTRACT

A method of dispensing the material that is heated by microwave energy immediately before the material is dispensed. The method comprises a series of steps including conveying the material through a pressurized passage through a dispensing tube that has radial boundaries transparent to microwave energy. The dispensing tube is located within a microwave resonant chamber. The microwave energy is channeled from a microwave generating source along a waveguide to the microwave resonant chamber. Material within the passage is heated by the microwave energy and produces a $TM_{020}$ heating profile with negligible heating at the radial boundaries of the dispensing tube. The material is dispensed onto a component along a path. The dispensing step requires a measure of time to define a dispensing cycle. The output of the microwave generating source is varied. The amount of microwave heating that occurs within the material is dependent upon the output of the microwave generating source. Material dispensed at a first point along the bond path is heated to a first temperature. Material dispensed at a second point along the bond path is heated to a second temperature.

14 Claims, 3 Drawing Sheets

IN-LINE MICROWAVE HEATING OF ADHESIVES

BACKGROUND OF THE INVENTION

1. Field of the Invention

The present invention relates to a method and apparatus for the dispensing of an adhesive material susceptible to microwave heating. More particularly the present invention is concerned with varying the dispensing temperature of the material throughout the dispensing cycle such that the material is heated to different temperatures at different locations on a component.

2. Description of the Related Art

Microwave heating offers numerous advantages over more traditional heating methods. Microwave heating provides low thermal capacitance, volumetric heating, high energy transfer efficiencies, and practically instantaneous control of dispensing temperature. It is therefore generally known to advantageously use the properties of microwave energy for the curing and preheating of various resin systems.

European patent number 0618057B1, which is commonly assigned and is hereby incorporated by reference, discloses a resin transfer molding method in which resin is heated by microwave energy immediately before the resin is introduced into a mold cavity. The European patent teaches an apparatus and method for heating a resin passing through a resonator chamber. The invention was useful for reducing the resin viscosity and the resin transfer molding cycle time. The resin in this system was not dispensed along different locations of a component. It was injected through a fixed resin inlet port to form a molded part.

U.S. Pat. No. 5,064,494, teaches a method of applying an adhesive to a body panel by pre-heating and at least partially curing the adhesive by microwave energy. The adhesive is fed through a tube and the tube was placed within a microwave cavity. Microwave energy is directed into the cavity to heat the adhesive within the tube. The U.S. Pat. No. 5,064,494 ('494) patent teaches uniformly heating all of the adhesive within the tube. The adhesives commonly used for bonding automotive panels such as those described in the reference are highly viscous. The adhesive moves much faster through the central portion of the tube than at the radial surface. Consequently, adhesive material at the inner surface of the tube is resident much longer in the chamber than adhesive passing through the center of the tube. Under the condition described in '494, the adhesive at the radial surface would be heated to a higher temperature than adhesive passing through the center of the tube due to its longer residence time. For reactive adhesives, this would cause the material at the radial surface to react more than material at the center of the tube. The reacted adhesive would tend to constrict the diameter of the tube, and would eventually plug the tube completely.

The '494 patent also teaches directing microwave energy along a length of the component after the adhesive has been dispensed along an elongated bond path. Discrete locations are heated to promote adhesive curing. This reference does not teach heating the adhesive to different temperatures along the bond path. Furthermore, this patent teaches heating the adhesive passing through the chamber to one temperature and dispensing the adhesive along a path at approximately an equal temperature. When the dispensing path is elongated (i.e. greater than 2 meters), the adhesive dispensed early in the dispensing cycle cools more than the adhesive dispensed later in the cycle due to the substrate acting as a heat sink. This uneven temperature affects the bonding properties of the adhesive. It is desirable that the dispensing unit control the temperature of the material such that temperature variations from the first dispensed material and the latter dispensed material be reduced when the adhesive is placed between the members to be joined. It is also desirable that the microwave heating device not overly heat material near the radial surfaces of the dispensing tube. Furthermore, it is desirable to finely control the dispensing temperature of a material while the material is dispensed along an elongated bond path. The temperature of the material may be profiled such that different locations along the bond path receive material at different temperatures.

These and other desired objects of the instant invention will become more apparent in the course of the following detailed description and appended claims. The invention may best be understood with reference to the accompanying drawings wherein illustrative embodiments are shown.

SUMMARY OF THE INVENTION

Responsive to the disadvantages of the prior art, the present invention is directed to a method of dispensing the material that is heated by microwave energy immediately before the material is dispensed. The method comprises a series of steps including conveying the material through a pressurized passage to a dispensing tube that has radial boundaries transparent to microwave energy. The dispensing tube is located within a cylindrical microwave resonant chamber. The microwave energy is channeled from a microwave generating source along a waveguide to the microwave resonant chamber. Material within the passage is heated by the microwave energy and produces a $TM_{020}$ heating profile with negligible heating at the radial boundaries of the dispensing tube. The material is dispensed onto a component along a bond path. The dispensing step requires a measure of time to define a dispensing cycle. The output of the microwave generating source is varied. The amount of heating that occurs within the material is dependent upon the microwave energy from the microwave generating source. Material dispensed at a first point along the bond path is heated to a first temperature. Material dispensed at a second point along the bond path is heated to a second temperature. Based on the type of material being dispensed, it is possible to either increase or decrease the adhesive dispensing temperature along the bond path.

When dispensing thermoplastic adhesive materials, it is often desirable that the adhesive have the same temperature along the entire bond path when two members are mated. By enabling the profiling of the adhesive temperature, it is possible to dispense adhesive along an elongated bond path and allow the adhesive to either heat or cool during the dispensing cycle such that the adhesive reaches a generally uniform temperature when it is trapped between the two members.

When dispensing reactive thermoset adhesive materials, it is often desirable that the adhesive have approximately the same state of cure along the entire bond path when the two member are mated. The level of cure can be varied by a number of conditions, one being the dispensing temperature of the adhesive. By applying the adhesive at different temperatures, the rate of adhesive cure and thus the state of cure may be varied. By profiling the adhesive temperature along the entire bond path, the state of adhesive cure may be timed to be essentially uniform.

The invention also provides for an apparatus useful in the above described method. An apparatus for the present invention includes a pressurized passage for conveying microwave heatable material. A dispensing tube having a radial boundary transparent to microwave energy is used to transport the material. The tube has a velocity profile corresponding to the amount of adhesive traveling through different cross sectional areas of the tube. A cylindrical microwave resonant chamber surrounds the dispensing tube having a $TM_{020}$ mode cavity that produces a heating profile with negligible heating at the dispensing tube radial boundaries. The cylindrical microwave resonant chamber produces a heating profile which substantially approximates the material velocity profile. A microwave generating source produces microwave energy that travels along a waveguide. The waveguide channels the microwave energy to the microwave resonant chamber. A system controller controls the power output of the microwave generating source. The amount of microwave heating is dependent upon the power output of the microwave generating source. The controller creates a temperature profile in the material throughout the dispensing cycle. The material is heated to a first temperature at a first point along the dispensing path and heated to a second temperature at a second point along the dispensing path. The system controller enables the material to be dispensed at a precise temperature at different locations along the bond path.

The apparatus and method thus described enables material to be dispensed at a controlled temperature along the bond path. Materials that generally cool after being dispensed, such as thermoplastic adhesives, are generally dispensed at higher temperatures early in the bond path and then at lower temperatures later in the bond path such that the earlier dispensed material is allowed to cool to approximately the temperature of the later dispensed material. When the adhesive is trapped between two members to be bonded, the temperature of the adhesive all along the bond path is approximately equal.

The apparatus also supports the controlled curing of reactive thermoset adhesives so that the state of cure for the adhesive along the bond path may be approximately the same when the members are mated. This condition is obtained by increasing the adhesive temperature during the dispense cycle such that the adhesive dispensed finally is at a higher temperature than that dispensed initially. Although the temperature of the dispensed adhesive varies along its path length, the extent of cure is approximately uniform. This improves the performance of the bond and reduces the cycle time of the bonding process so that the last applied adhesive is at a ready state for bonding and the first applied adhesive has not over-cured.

These and other desired objects of the instant invention will become more apparent in the course of the following detailed description and the appended claims. The invention may best be understood with reference to the accompanying drawings wherein the illustrative embodiments are shown.

DETAILED DESCRIPTION OF THE PREFERRED EMBODIMENTS

Figure 1:
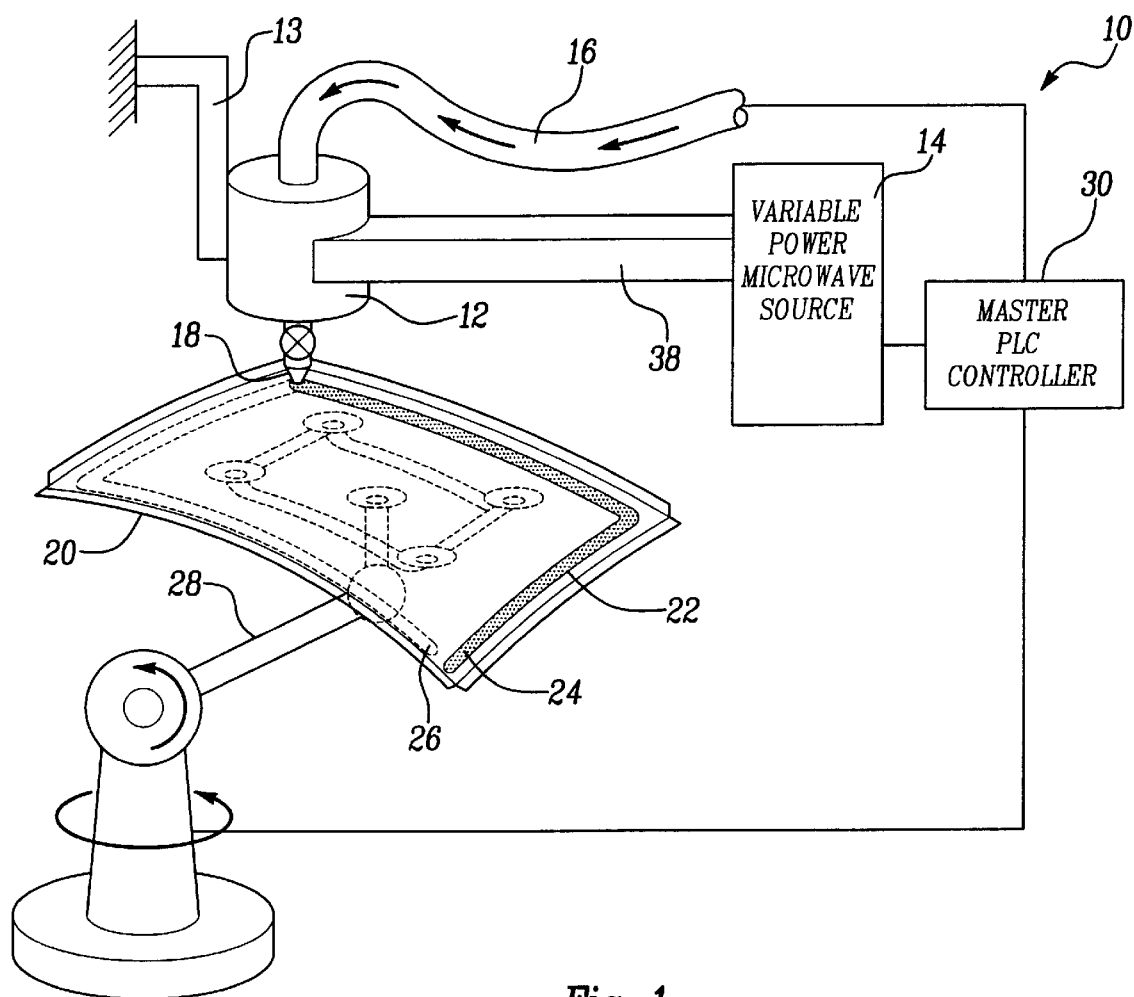
FIG. 1 is a perspective view of a microwave heating device dispensing adhesive material along an elongated bond path.

The instant invention will be described through a series of drawings, which illustrate an adhesive dispensing apparatus and method of operating same. The invention may be utilized with a wide variety of microwave heatable materials and dispensers.

The following items are a word list of the items described in the drawings and are reproduced to aid in understanding the invention:

| | |
|---|---|
| 10 | Adhesive dispensing device |
| 12 | Adhesive dispensing head incorporating microwave pre-heater chamber |
| 13 | Stationary Support Arm |
| 14 | Variable Power Microwave Source |
| 16 | Adhesive supply tube |
| 18 | Dispensing tip |
| 20 | Component |
| 22 | Elongated adhesive bond path |
| 24 | Starting point |
| 26 | Ending point |
| 28 | Robot |
| 30 | PLC system controller |
| 32 | Cylindrical microwave resonant chamber |
| 34 | Cylindrical walls of microwave chamber |
| 36 | Adhesive carrying tube |
| 38 | Waveguide |
| 40 | Aperture |
| 42 | Electric field profile |
| 44 | Location of maximum heating |
| 45 | Location of zero heating |
| 46 | Center line of pipe |
| 48 | Radial boundary |
| 50 | Rectangular resonant chamber |
| 52 | Rectangular walls |
| 54 | Double plunge tuner |
| 56 | Slotted microwave choke |
| 57 | Location of maximum field |
| 58 | Location of zero field |

One embodiment of the present invention is illustrated in FIG. 1 and concerns an adhesive dispensing device 10. The dispensing device 10 includes a microwave pre-heater 12 attached to a stationary support arm 13. The microwave pre-heater 12 receives a quantity of adhesive from through either a flexible or rigid supply tube 16. The adhesive is heated in the microwave pre-heater 12 and is applied to a component through a dispensing tip 18. The adhesive is used to bond the component to a member. Illustrated in FIG. 1 is a component 20 having an elongated bond path 22. The bond path 22 is generally greater than one meter and requires a length of time to dispense adhesive from the starting point 24 to the ending point 26. Adhesive dispensing equipment generally operates at rates below 0.5 m/sec. The length of time required to dispense the adhesive from the starting point 24 to the ending point 26 is the dispensing cycle time. When it is useful to manipulate the component, a six axis robot 28 receives and manipulates the component 20 to enable a wide variety of contact angles between the dispensing tip 18 and the bond path 22.

In some applications, it is useful to move the microwave dispensing head 12, via attachment to a robot, instead of manipulating the component 20. While it would be possible in principle to mount both the dispense head and component on robotic arms, as a practical matter, it is preferable that either the component or the dispense head be stationary.

The apparatus also includes one or more Programmable Logic Controllers (PLC) 30 that control and synchronize the microwave power output, dispensing equipment and robot 28. The invention utilizes an in-line microwave heating system to heat the adhesive material, either thermoset or thermoplastic, immediately prior to dispensing the adhesive on the component.

Figure 2:
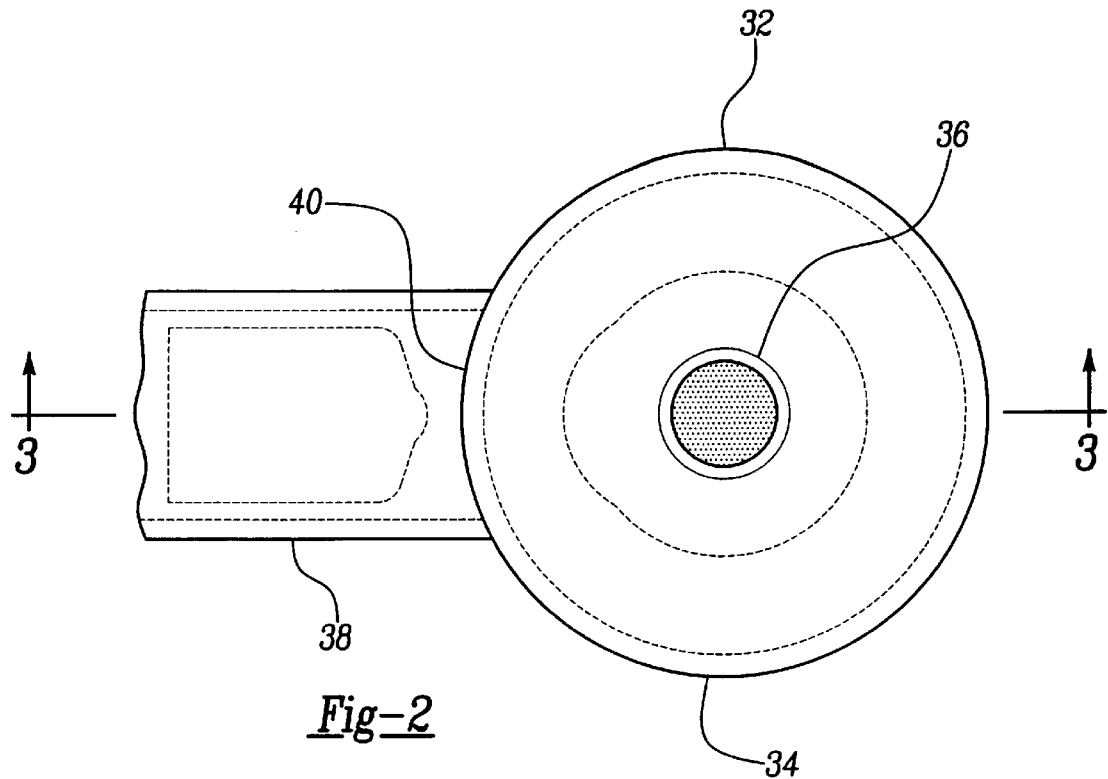
FIG. 2 is a plan view of a cylindrical microwave resonant chamber.

Illustrated in FIG. 2, is a generic cylindrical microwave resonant chamber 32 with an axially placed tube 36 through which the adhesive is pumped. The tube 36 is made from a material that is generally not heatable by microwave energy. Suitable materials include those with a low dielectric loss factor and suitably high temperature performance e.g. polytetrafluoroethylene (PTFE), glass or ceramic. Attached to the resonant chamber 32, is a microwave waveguide 38 that channels microwave energy from a variable power microwave source 14 having a variable power output. The aperture 40 between the waveguide 38 and the chamber 32 is sized so that the maximum amount of energy is coupled into the chamber resulting in an improved efficiency. Microwave energy which is not coupled into the chamber is reflected back along the waveguide where it is dissipated into a waterload (not shown).

Figure 3:
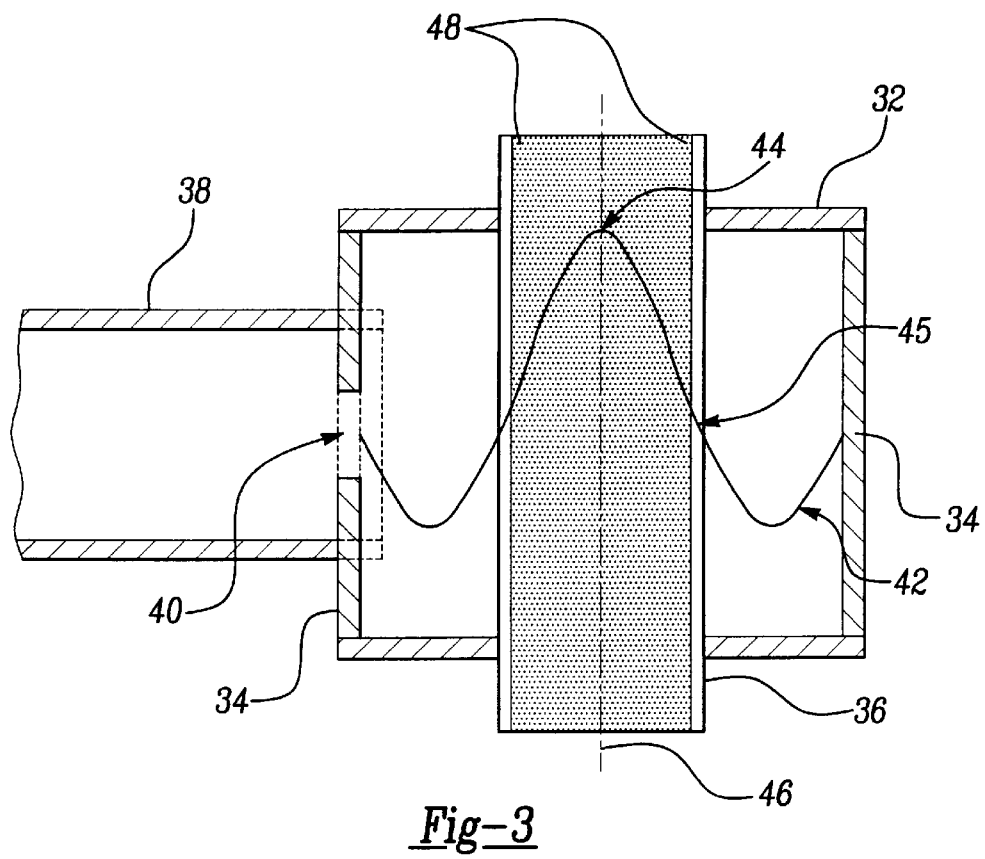
FIG. 3 is a cross-sectional view of a cylindrical $TM_{020}$ mode microwave resonant chamber showing a first electric field profile.

For processing thermosetting adhesives such as two component epoxies, a cylindrical microwave chamber resonant within a $TM_{020}$ mode is desirable, as illustrated in FIG. 3. The diameters of the axially positioned tube and cylindrical chamber are selected to achieve resonance within the $TM_{020}$ mode where the electric field 42 is a maximum along the axis of the tube at location 44 and a minimum at the radial boundary of the tube, location 45. The rate of temperature rise within the adhesive is a function of the electric field strength 42. Where the electric field is a maximum 44, maximum heating occurs, similarly where the electric field is zero 45, zero heating occurs.

Viscous adhesive traveling through the tube 36 has a velocity profile approximately coinciding with the electric field profile 42. Adhesive material traveling along the axis of the tube 46 travels much faster than adhesive traveling along the tube radial boundaries 48. The residence time of the adhesive within the chamber 32 is dependent upon where it passes through the tube 36. Adhesive traveling along the tube axis 46 has a longer residence time than material traveling along the radial boundary 48. By matching the microwave electric field profile 42 with the velocity profile, the adhesive may be uniformly heated across the tube section 36. This avoids excess heating of the adhesive along the radial boundary 48 or causing the adhesive to cure prematurely within the tube 36. Curing adhesive would constrict the cross-sectional area of the tube 36 requiring maintenance of the apparatus 10.

When the thermoset adhesive is dispensed at the starting point 24, polymerization or cure occurs resulting in solidification. The initial form of solidification is skinning of the adhesive which subsequently inhibits wetting of the attached members and ultimately the performance of the bond. The period between the initiation of cure and the onset of skinning is called the "open time." A number of factors influence an adhesive's open time including, the activation temperature, humidity, surface area and composition. However, utilizing the present invention, the open time of the adhesive may be varied as the dispensing tip 18 traverses the bond path 22. Adhesive heated to a higher temperature tends to have a shorter open time. By dispensing the adhesive at the starting point 24 at a lower temperature than the adhesive dispensed at the ending point 26, the open time for all of the adhesive along the bond path 22 may be optimized for the component and member to be bonded.

The open time is a measure of the adhesive state of cure. By accelerating the rate of cure of the latter dispensed adhesive relative to the earlier dispensed adhesive, the entire bond path 22 may be tailored to be at approximately the same state of cure when the component 20 is attached to a member. This has the effect of reducing the cycle time of the bonding operation, because the open time of the last dispensed material may be made very short so that the component 20 may be bonded immediately after the dispensing step is complete. If the adhesive along the entire bond path is heated to this high temperature, it would create a short open time and a weak bond at the starting point 24 caused by the poor wetting performance.

One specific example for bonding automotive hoods using a two component epoxy thermoset adhesive may use an ambient starting temperature of approximately 25° C. As the dispensing tip 18 moves along the bond path 22, the temperature of the adhesive is increased until finally reaching the end point 26. The temperature of the adhesive dispensed at the end point 26 may be any desired temperature, however for a two component thermosetting adhesive it is unlikely to exceed 100° C. The elapsed time of the dispensing cycle causes the adhesive at the start point 24 to react and cure. The work piece 20 is joined with another member (not shown) at a time when the adhesive all along the bond path 22 is approximately at the same state of cure.

The temperature of the adhesive is directly proportional to the magnitude of the microwave electric field strength. The energy of the microwave field is controlled by the power output of the microwave source 14. The PLC system controller 30 controls the output of the microwave source 14. Increased power output of the microwave source 14 increases the microwave electric field strength which results in the higher temperature increase in the adhesive.

Figure 4:
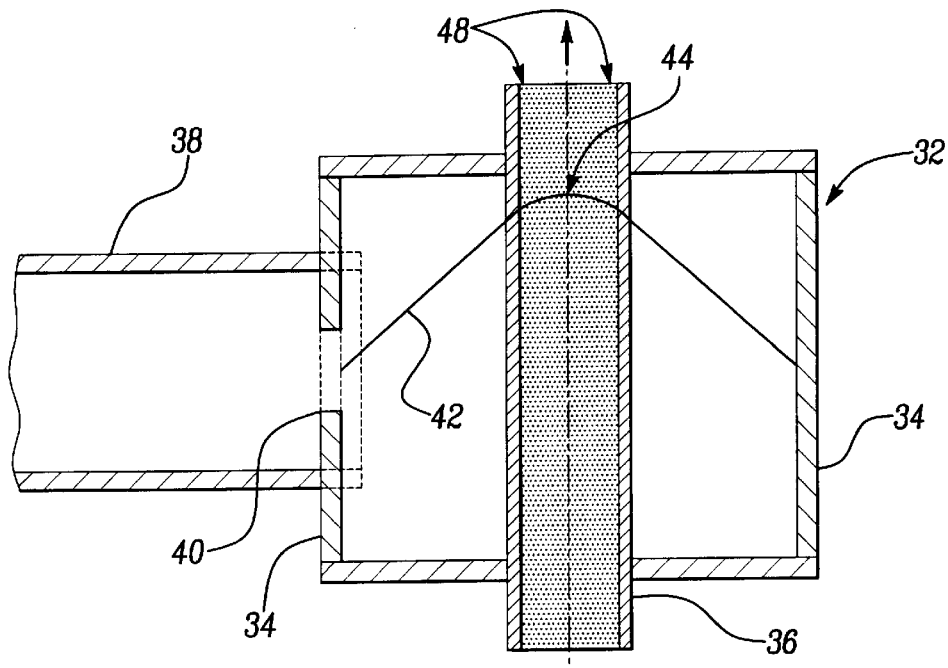
FIG. 4 is a cross-sectional view of a cylindrical $TM_{010}$ mode microwave resonant chamber showing a second electric field profile.

For the processing of thermoplastic adhesives either a cylindrical $TM_{010}$ or rectangular $TE_{10n}$ mode chamber can be used. Illustrated in FIG. 4 is a cross-sectional view of a cylindrical microwave chamber resonant within a $TM_{010}$ mode. The microwave energy is directed from the microwave source 14 along the waveguide 38. The microwave energy passes through an aperture 40 and enters the resonant chamber 32. The diameters of the tube and chamber are chosen to achieve resonance within the $TM_{010}$ mode. The corresponding electric field profile associated with such a mode 42 is a maximum along the axis 44 and zero at the chamber wall 34. A cylindrical $TM_{010}$ mode chamber produces an electric field profile which is approximately uniform across the tube section. However, the temperature profile across the tube section will depend upon the local residence time of the adhesive and its position within the tube. Adhesive at the radial tube boundary will have a higher residence time than adhesive along the axis, thus it follows that the temperature of the adhesive at the radial boundary will be higher than that along the axis. In the case of mixed thermoset adhesives, a cylindrical $TM_{010}$ mode microwave chamber would result in cure at the radial tube boundary.

Figure 5:
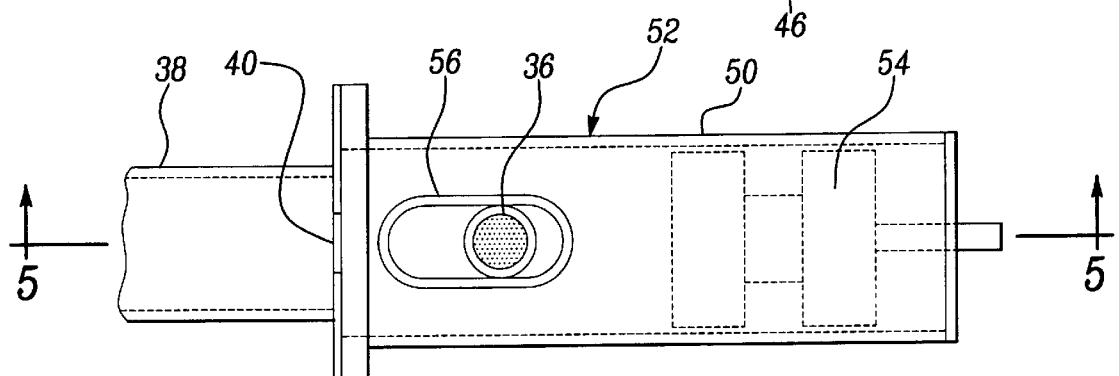
FIG. 5 is a plan view of a rectangular $TE_{10n}$ mode microwave resonant chamber with adjustable double plunge tuner.
Figure 6:
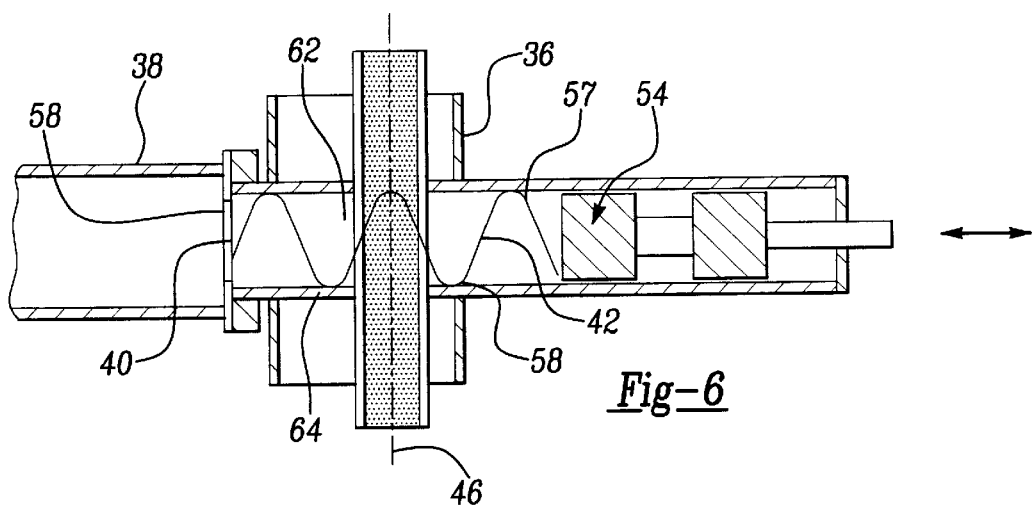
FIG. 6 is a cross-sectional view of the resonant chamber illustrated in FIG. 5, taken along the lines 5—5, and showing a third electric field profile.

An alternative to the cylindrical $TM_{010}$ mode microwave chamber is a rectangular $TE_{10n}$ mode version as illustrated in FIGS. 5 and 6. Both the cylindrical $TM_{010}$ mode and rectangular $TE_{10n}$ mode chambers produce a similar electric field profile across the tube carrying the adhesive. The advantage of the rectangular $TE_{10n}$ version is its ability to be retuned for different adhesives, thus offering improved versatility over the cylindrical $TM_{010}$. chamber. By adjusting the position of the double plunge tuner 54 the length of the rectangular $TE_{10n}$ chamber can be varied so that its resonant frequency can be altered to match that of the microwave source 14 and thus maintain maximum efficiency. Retuning the cylindrical $TM_{010}$ mode chamber would necessitate altering the chamber bore. Adjusting the length of the rectangular $TE_{10n}$ mode chamber via the double plunge tuner causes a shift the electric field distribution and hence thermal profile within the adhesive. To minimize the electric field variation across the tube section, the tube can be moved within the slotted microwave choke. The tube is positioned so that the maximum heating 44 occurs along the axis of the pipe where flow rates are greatest. The location of maximum heating 44 of the adhesive occurs at the location of the maximum electric field 57 that overlies the tube 16. The location of zero heating 45 of the adhesive occurs at the location of zero electric field 58 that overlies the tube 16. Again, it is desirable that the maximum heating 44 coincide with the centerline 46 of the tube 16.

The invention is thus described as being directed to applying an adhesive to a work piece. It is also suitable for heating other microwave heatable materials such as liquid resins, oils and paints.

It is thus seen that the objects of this invention have been fully and effectively accomplished. It will be realized, however, that the foregoing preferred embodiments have been shown and described for the purpose of illustrating the functional and structural principles of this invention and are subject to change and modification by those skilled in the art without departing from the principles described. Therefore, this invention includes all modifications encompassed within the spirit and scope of the following claims:

What is claimed:

1. A method for dispensing an adhesive material that is heated by microwave energy immediately before said material is dispensed, said method comprising the steps of:

conveying said material through a pressurized passage to a dispensing tube transparent to microwave energy;

locating said dispensing tube within a microwave resonant chamber;

channeling a first unit of microwave energy from a microwave generating source along a waveguide to said microwave resonant chamber;

heating said material with said first unit of microwave energy to a first temperature;

dispensing said material heated by said first unit of microwave energy onto a component at a first location along a path; and varying the output of said microwave generating source and channeling a second unit of microwave energy to said microwave resonant chamber and heating said material with said second unit of microwave energy to a second temperature different from said first temperature.

2. The method according to claim 1, wherein said material heated by said second unit of microwave energy is dispensed at a second location along said path.

3. The method according to claim 1, wherein said material comprises a thermoplastic adhesive.

4. The method according to claim 1, wherein said material comprises a reactive adhesive.

5. The method according to claim 1, wherein said dispensing path is an elongated bond line greater than 2 meters.

6. The method according to claim 5, wherein the varying step varies the temperature of said material continuously along said bond path.

7. The method of claim 1, further comprising the step of joining said component to a member when the temperature of the material heated by said first unit of microwave energy is at approximately the same temperature as the material heated by said second unit of microwave energy.

8. The method according to claim 1, wherein said microwave resonating chamber is cylindrical and is a $TM_{020}$ mode cavity and said dispensing tube is cylindrical and passes through the center of said resonating chamber, whereby material passing through the center of said tube is heated much more than material passing along the tube radial boundaries.

9. The method according to claim 8, wherein the material has a velocity profile through said dispensing tube and further comprising producing a microwave electric field that matches said velocity profile whereby material passing through said tube is evenly heated along a radial cross section of said tube.

10. The method according to claim 1, wherein said material is a reactive thermoset that becomes activated when heated by said microwave energy and undergoes states of cure and further comprising the step of joining said component to a member when the state of cure of the material heated by said first unit of microwave energy is at approximately the same state of cure as the material heated by said second unit of microwave energy.

11. The method according to claim 7, wherein the joining step occurs when the temperature of said material at multiple points along said path is approximately equal.

12. An in-line microwave heating apparatus for dispensing a microwave heatable material wherein said material is heated by microwave energy immediately before said material is dispensed onto a component along a path whereby a measure of time required to dispense said path defines a dispensing cycle, said apparatus comprising:

a pressurized passage for conveying said material;

a dispensing tube having radial boundaries transparent to microwave energy, said material having a velocity profile through said dispensing tube;

a cylindrical microwave resonant chamber surrounding said dispensing tube and being a $TM_{020}$ mode cavity that produces negligible heating at said dispensing tube radial boundaries, said cylindrical microwave resonant chamber producing a heating profile which substantially approximates said material velocity profile;

a microwave energy generating source;

a waveguide to channel said microwave energy to said microwave resonant chamber; and a PLC system controller which controls the power output of said microwave generating source and profiles said material temperature throughout said dispensing cycle such that said material is heated to a first temperature at a first point along said path and said material is heated to a second temperature at a second point along said path.

13. An in-line microwave heating apparatus of claim 12, wherein said apparatus is mounted on a robotic arm, and said component is mounted in a stationary position, said arm being movable in relationship to said stationary component during said dispensing cycle.

14. An in-line microwave heating apparatus of claim 12, wherein said component is mounted on a robotic arm, and said apparatus is mounted in a stationary position, said arm being movable in relationship to said stationary apparatus during said dispensing cycle.

* * * * *